United States Patent [19]

Ward

[11] Patent Number: 4,637,750
[45] Date of Patent: Jan. 20, 1987

[54] EVAPORATIVE COOLER BLOWER ROTOR-SHAFT SECURING HUB

[76] Inventor: Edward F. Ward, 8802 CRB, Tucson, Ariz. 85738

[21] Appl. No.: 610,276

[22] Filed: May 14, 1984

[51] Int. Cl.⁴ ............................................. F16C 25/00
[52] U.S. Cl. ................................... 403/344; 403/312; 403/261; 403/273; 416/187; 416/244 R
[58] Field of Search ............... 403/344, 312, 373, 261, 403/262; 416/178, 187, 214 R, 244 R

[56] References Cited

U.S. PATENT DOCUMENTS

| | | | |
|---|---|---|---|
| 316,919 | 4/1885 | Stuart | 403/312 |
| 318,078 | 4/1888 | Murphy | 416/178 X |
| 406,287 | 7/1889 | Kehler | 403/344 X |
| 653,659 | 7/1900 | Chillingworth | 403/344 X |
| 917,479 | 4/1909 | Noble | 403/344 X |
| 2,932,446 | 4/1960 | Zaro | 416/178 |
| 4,019,824 | 4/1977 | Percy | 403/261 |

FOREIGN PATENT DOCUMENTS

| | | | |
|---|---|---|---|
| 96935 | 4/1898 | Fed. Rep. of Germany | 403/373 |
| 5254 | of 1885 | United Kingdom | 403/312 |

Primary Examiner—Cornelius J. Husar
Assistant Examiner—Joseph A. Fischetti
Attorney, Agent, or Firm—J. Michael McClanahan

[57] ABSTRACT

An evaporative cooler blower rotor-shaft securing hub adapted to re-secure a failed blower rotor bushing attaching to the blower rotor central shaft comprising a pair of steel straps having a half circle formed in each, said steel straps adapted to encircle and hold the central shaft in fixed relationship, and a pair of concentric half circle flanges with attached right angle brackets, said right angle brackets adapted to be attached to said central shaft securing steel straps, and said concentric half circle flanges adapted to be secured to said blower rotor bushing whereby the concentric half circle flanges secure the blower rotor bushing to the steel straps encircling the central shaft, and the steel straps secure against the central shaft whereupon the blower rotor bushing is re-secured to the central shaft.

2 Claims, 6 Drawing Figures

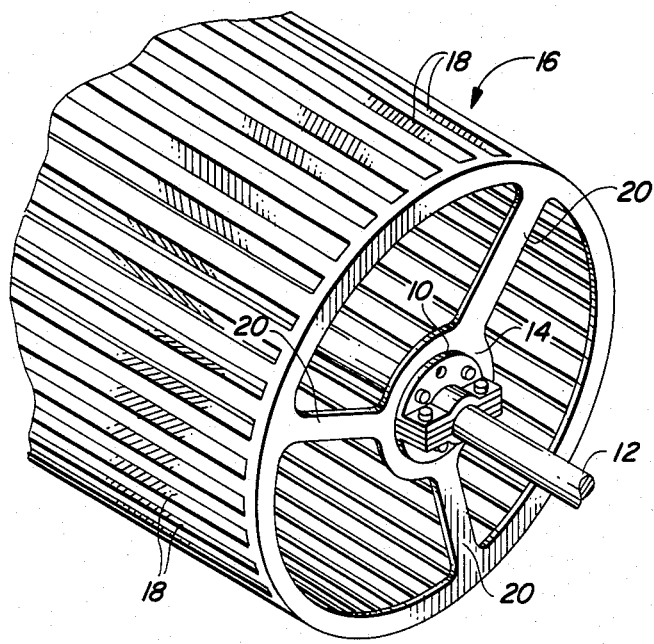
FIG.-1
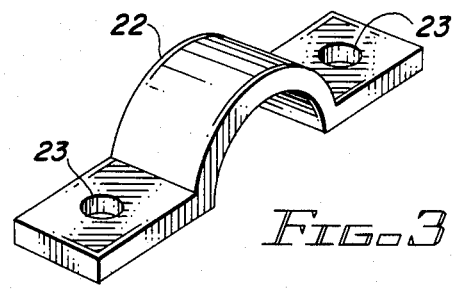
FIG.-3
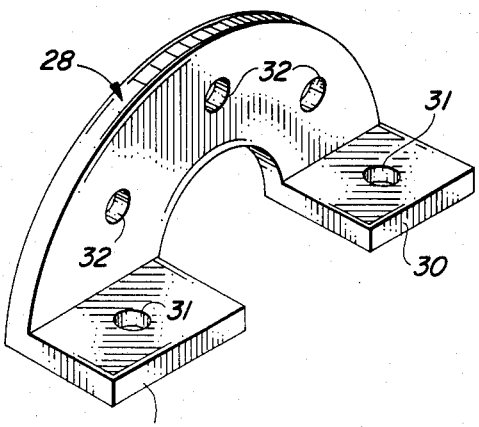
FIG.-4
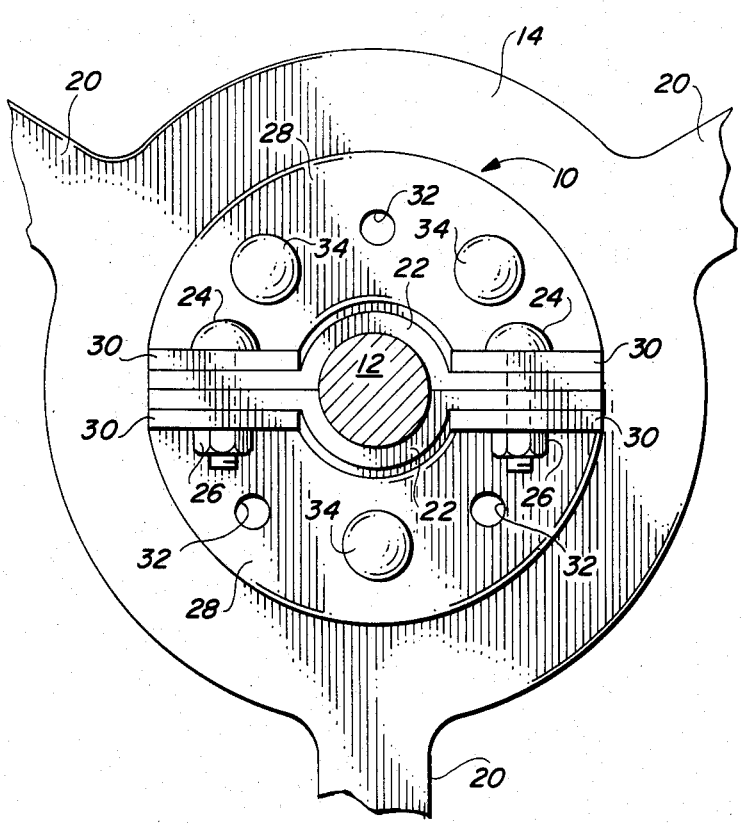
FIG.-2
FIG.-5
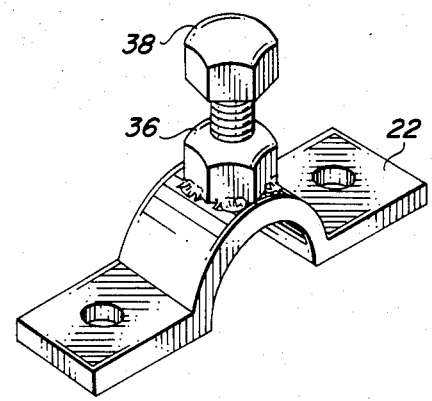
FIG.-6

EVAPORATIVE COOLER BLOWER ROTOR-SHAFT SECURING HUB

BACKGROUND OF THE INVENTION

In those areas of the world which are characterized by a dry climate during the hot periods of the year, evaporative coolers have been long utilized as a means to achieve space cooling. In an evaporative cooler of the type currently in use in the Southwestern portion of the United States, the construction is characterized by an internally enclosed air blower mechanism surrounded by water soaked pads, air being drawn from the outside through the water soaked pads by the internally contained blower and then the moisture laiden air, now cooled by the evaporation of water, is directed to the home or building which is to receive the space cooling. In this respect, it is common to re-circulate water through the outside pads, the water being collected in a common pan situated below the pads through which the air passes.

The blower mechanism most common to the evaporative cooler comprises a motor driven squirrel cage type blower rotor and a cylindrical enclosure. Air is drawn into the squirrel cage blower rotor at each of its circular ends. The squirrel cage blower rotor is surrounded by the cylindrical enclosure which has an opening located tangentially the cylindrical surface of the rotor and transverse the axis of the rotor, and also has opposite openings proximate the circular ends of the rotor. The blower rotor forcifully directs the air out the tangentially located opening.

The evaporative cooler squirrel cage type blower rotor is situated upon a central shaft which protrudes from both sides of oppositely located openings in the enclosure through which air enters, the central shaft held in place by bushings attached to the enclosure, and is rotationally driven by a pulley attached to the central shaft, the pulley attached in turn by a belt to the motor pulley.

In the construction of the squirrel cage blower rotors, it is common to have three spindles which connects the circular end of the blower rotor to a bushing located on the central shaft which is ultimately driven by the motor. These spindles are located at each end of the squirrel cage blower rotor. The bushings, in turn, are fixedly attached to the central shaft.

It is common in evaporative cooler usage that after the cooler has been operated for an extended period of time, the bushings attaching the squirrel cage blower rotor to the central shaft becomes loose because the mechanical means holding the connection breaks. The looseness between the bushings and the shaft is due to the multiple starting of the motor and the fact that an air blower or fan, when running, is always working at full load. Also, when one bushing loses its hold on the shaft because of the load placed on it, the resisting force of the blower rotor is then transferred to the other remaining bushing, which very shortly, causes it to fail, now also slipping on the central shaft. At this point in time, the shaft continues turning, the blower rotor slips excessively, and eventually reaches the point that practically no rotational movement is imparted to the blower rotor. When this condition occurs, the present repair procedure is to disassemble the blower mechanism assembly and replace the squirrel cage blower rotor, spindles, and bushings with new parts, and oft-times also a new shaft.

Accordingly, there exists a need for a means or device by which the bushing connecting the blower rotor may be re-attached to the central shaft without installing a new blower rotor and its associated bushing to the old shaft or to a new shaft, and to have a device which is installable without removal of the blower rotor and central shaft assembly.

SUMMARY OF THE INVENTION

The subject invention defines a device by which an evaporative cooler blower rotor may be re-attached to its central shaft when the existing bushing fails. To this end, the Inventor has devised a device which secures the central shaft by forcibly engaging it around its periphery by two flat steel straps with a half circle formed therein, the pair of steel straps held around the central shaft by a nut and a bolt on each side; and the steel straps operably attached to the blower rotor bushing by a concentric half circle flange with right angle brackets attached along the flat side of the flange, the right angle brackets fitted with holes through which the steel strap bolts are placed. Finally, the concentric half circle flange is attached to the blower rotor bushing by bolts which pass through the concentric half circle flange and the blower rotor bushing.

The invention above described is emplaced between the blower rotor bushing and the central shaft by only requiring the drilling of three evenly spaced holes in the bushing to match existing holes in the concentric half circle flange without the need of disassembling the blower motor assembly.

It is an object of the subject invention to provide means to re-secure the blower rotor bushing to the central shaft after the blower rotor bushing fails and is no longer secured to the central shaft.

It is another object of the subject invention to provide means by which the blower rotor bushing may be re-secured to the central shaft in an evaporative cooler without removing the blower rotor and shaft from the blower assembly.

Other objects of the invention will in part be obvious and will in part appear hereinafter. The invention accordingly comprises the apparatus possessing the construction, combination of elements, and arrangement of parts which are exemplified in the following detailed disclosure, and the scope of the Application which will be indicated in the claims.

BRIEF DESCRIPTION OF THE DRAWINGS

For further understanding of the nature and objects of the present invention, reference should be had to the following detailed description taken in connection with the accompanying drawings wherein:

FIG. 1 is a perspective view of the invention in place attaching the blower rotor bushing to the central shaft;

FIG. 2 is a front elevational view of the subject invention;

FIG. 3 is a perspective view of the shaft holding flat steel strap with the formed half circle;

FIG. 4 is a perspective view of the concentric half circle flange;

FIG. 5 is an end view of the concentric half circle flange showing the right angle bracket; and FIG. 6 is an alternate embodiment of the shaft holding flat steel strap with the formed half circle.

In various views, like index numbers refer to like elements.

DETAILED DESCRIPTION OF THE PREFERRED EMBODIMENT

Referring now to FIG. 1, a perspective view of the inventive evaporative cooler blower rotor shaft securing hub 10 shown in place securing central shaft 12 to blower rotor bushing 14. In FIG. 1, the squirrel cage type blower rotor 16 is illustrated, showing the typical squirrel cage construction of two circular ends connected by a cylindrical surface. In the case of the evaporative cooler blower rotors, this cylindrical surface has a large number of sheet metal vanes 18 which, in typical construction, are thin metal straps extending between each circular end, each having a width of about 1-inch. These vanes 18 are aligned substantially with their widths slightly askew from a radial line passing from the center of central shaft 12 to the vane. The squirrel cage rotor is suspended from central shaft 12 by means of spindles 20 (most commonly 3 are utilized), spindles 20 connecting the periphery of the blower rotor 16 to the blower rotor bushing 14. In the usual construction of bushing 14, bushing 14 comprises a circular flange (shown) attached to an annular collar (not shown) which engages central shaft 12 in a tight press-fit construction. In many cases, the flange portion of bushing 14 and the annular collar which surrounds central shaft 12 may be one piece, formed from a circular piece of sheet metal with the annular collar being the center of the metal bent back to a right angle. In other cases, the annular collar may have a threaded set screw penetrating in at right angles to engage the central shaft. It is this holding relationship between bushing 14 and central shaft 12 which, after a period of time, will give, permitting central shaft 12 to rotate freely interiorly to the annular collar of bushing 14.

In operation, and as described previously, blower rotor 16 rotates around central shaft 12 inside a cylindrical type enclosure (not shown), central shaft 12 protruding from the enclosure through a pair of oppositely located openings, there to engage bearings (not shown) attached to the enclosure and suspending central shaft 12 in space. To one end of central shaft 12 is attached a pulley (not shown), the pulley being driven by a belt (not shown) which encircles a pulley (not shown) attached to a blower motor (not shown), such blower motor situated on the outside surface of the cylindrical enclosure. The two oppositely directed holes in the enclosure through which the central shaft 12 protrudes allows the entrance of air into the enclosure and into the circular ends of blower rotor 16 whereby the rotating blower rotor 16 forcibly directs the air through a third opening in the enclosure, the third opening (not shown) located tangentially to the cylindrical surface of the blower rotor and transverse to the axis of the blower rotor.

Referring now to FIG. 2, a front elevational view of the inventive blower rotor-shaft securing hub 10 is shown connecting central shaft 12 to bushing 14. Shown is the outline of the blower rotor bushing 14 and the beginning of spindles 20 which connect at the ends of blower rotor 16. The device 10 which re-secures the blower rotor bushing 14 to shaft 12 comprises firstly the flat steel straps 22 with the half circles formed in the middle, of which straps there are two, each of the steel straps 22 surrounding one-half the circumference of central shaft 12 and then directed radially outward from central shaft 12 with ears for connection and holding by a bolt and nut to tie down upon central shaft 12. Shown in FIG. 2 are two bolts 24 and corresponding nuts 26. The bolts 24 pass through pre-drilled or punched holes in the steel straps 22. Juxtaposed the ears of flat steel straps 22 on both sides are concentric half circle flange 28, its right angle brackets 30 actually touching the ears of steel straps 22 also pre-drilled or punched with a hole to receive the shank of bolts 24.

Into the concentric half circle flange 28 is drilled or punched a plurality of holes which are designed to receive, after corresponding holes have been drilled in bushing 14, bolts such as those indicated by number 34, the nuts of which are threaded onto bolts 34 being hidden from view.

By such combination, the blower rotor bushing 14 is now securely held to central shaft 12, replacing the securing action originally accomplished by the now failed bushing 14.

In assembling the invention, it is suggested that the following order be followed. Each inventive hub 10 is placed against the existing blower rotor bushing 14 in the space located between the bushing and the bearing about which central shaft 12 rotates. In most instances, there is a space of ½ to 1 inch. The invention is assembled, firstly by placing two steel straps 22 around central shaft 12, and while holding them with the operator's fingers, the brackets 30 of two concentric half circle flanges 28 are situated to rest upon the ears of steel straps 22. Then bolts 24 are put in place through the pre-drilled or punched holes on each of the concentric half circle flanges brackets 30 on the outside and the two flat steel straps 22 on the inside. That being accomplished, nuts 26 are screwed on the ends of bolts 24 until the flat steel straps 22 half circles have engaged central shaft 12 sufficiently to prevent easy movement of the device around central shaft 12. Then, at least three equally spaced holes are drilled or punched into blower rotor bushing 14, using concentric half circle flange holes 32, of which there are three on each flange, as a guide. Thereafter, flange bolts 34 are pushed through the holes 32 and holes drilled into blower rotor bushing 14, and by reaching between the spindles 20, nuts are threaded on the ends of the flange bolts 34 until they are finger tight. Next, nuts 26 on bolts 24 are tightened until the operator is convinced that a good and sufficient securing connection is made on the periphery of central shaft 12. Lastly, the nuts are tightened on flange bolt 34.

The same operation is accomplished on the opposite side of the blower rotor bushing in order to provide additional reliability.

Referring now to FIG. 3, a perspective view of one of the two identical flat steel straps 22 is shown. As seen, flat steel strap 22 comprises a short length of flat steel having a half circle formed in its center. It is anticipated that the inside radius of the half circle formed in steel strap 22 should be a few thousandths inch less than the outside diameter of central shaft 12 in order that when the two straps are pulled together over central shaft 12, there will be sufficient pinching action to secure the steel straps to the central shaft. On opposite sides of steel straps 22 are the formed holes 23 which are prepared by drilling or punching. In the preferred embodiment, steel strap 23 is approximately 3 inches from end to end and is approximately ⅜th. inch wide. The part may be formed by a press, the steel being of a thickness of about 1/16th. to ⅛th. inch.

Referring now to FIG. 4, a perspective view of the concentric half circle flange 28 is shown. As its name implies, the flange consists of sheet metal such as steel formed between two half circles, with right angle brackets 30 attached at its flat side. In most cases, concentric half circle flange 28 is made from one piece, the right angle brackets 30 being formed by bending. Shown in concentric half circle flange 28 are the plurality of flange holes 32 adapted to receive the flange bolts 34 described in FIG. 2. Approximately centrally located in the right angle brackets 30 are formed holes 31, also prepared by drilling or punching as are flange holes 32. The holes 31 in concentric half circle flange 28 are designed to be in line with the holes 23 in flat steel straps 22.

In the preferred embodiment, the outer half circle of concentric half circle flange 28 normally has a radius of 1½ inches, and the radius on the inner half circle a radius larger than the central shaft 12. In FIG. 2, the inner radius of concentric half circle flange 28 is shown having a radius larger than the outside radius of the half circle formed in steel strap 22, although this need not be necessary. Again, as was the case for the flat steel strap 22, the concentric half circle flange 28 may be formed by machining or made from a punch press, right angle brackets 30 then being formed by a right angle break. Metal utilized in concentric half circle flange 28 may be in a thickness of 1/32nd. to ⅛th. inch, the piece not requiring to have the strength of the flat steel straps 22.

Referring briefly to FIG. 5, an end view of concentric half circle flange 28 is shown, the flange portion being upright with right angle bracket 30 at a 90° angle to flange 28. Shown in dotted form in FIG. 5 are the holes wihch pass through flange 28 and bracket 30. Total width of brackets 30 would not be greater than ½ inch.

In FIG. 6 is illustrated an alternate embodiment of a flat steel strap 22 which has been modified to add nut 36, nut 36 adapted to receive set screw 38. Into the rounded portion of steel strap 22 is drilled a hole to allow passage of the shank of set screw 38. The obvious purpose of set screw 38 is to further engage central shaft 12 to more assuredly secure central shaft 12 to the pair of steel straps 22. The alternate embodiment shown in FIG. 6 may be used singly in attachment to central shaft 12, or two may be employed, one on each side. Naturally, the set screw 38 nut 36 combination must be small enough as not to interfere with flange bolts 34 if the flange hole 32 used is directly over set screw 38. Obviously, if there would be a problem in this respect, the other two flange holes 32 in each of the concentric half circle flanges 28 may be utilized. Nut 36 is attached to the top of steel strap 22 half circle by welding or brazing.

While the invention has been described for an application securing the bushing of an evaporative cooler squirrel cage blower rotor bushing to its central shaft, it is obvious that the device would apply to securing any bushing to a central shaft which permitted engagement of the bushing by the flange.

While a preferred and alternate embodiment of applicant's invention has been shown and described, it is appreciated that still other embodiments of the invention are possible and that there is no intent to limit the invention by such disclosure, but rather it is intended to cover all modifications and alternate embodiments falling within the spirit and the scope of the invention as defined by the appended claims.

I claim:

1. A securing hub adapted to secure a bushing to a central shaft comprising:

a first strap defining a semi-circle adapted to encircle a portion of the central shaft, said first strap also including a pair of oppositely protruding ears adapted to protrude from the central shaft, each of said pair of ears including an opening therethrough;

a second strap defining a semi-circle adapted to encircle a portion of the central shaft, said second strap also including a pair of oppositely protruding ears adapted to protrude from the central shaft, each of said pair of ears including an opening therethrough; said first and second straps adapted to co-act in surrounding the central shaft with one of each pair of ears of said first and second strap proximate each other, on opposite sides of the central shaft, and openings aligned;

a first flange adapted to be secured to the bushing and to be secured to said first strap, said first flange defining concentric half circles with a pair of spaced apart right angle brackets attached thereto, each of said pair of brackets including an opening therethrough;

a second flange adapted to be secured to the bushing and to be secured to said second strap, said second flange defining concentric half circles with a pair of spaced apart right angle brackets attached thereto, each of said brackets including an an opening therethrough, both of each of said first and second flange right angle bracket openings adapted to coincide with said openings of said first and second strap protruding ears respectively; and a plurality of bolts and nuts adapted to penetrate the aligned openings of said first and second strap, and said first and second flanges respectively, on both sides of the central shaft in order that said nuts may be tightened upon said bolts to compress and secure said first and second straps against the central shaft and to secure said first flange to said first strap and said second flange to said second strap whereby the bushing, being secured to said first and second flange, is thereby secured to the central shaft.

2. The securing hub as defined in claim 1 wherein said pair of spaced apart right angle brackets attached respectively to said first flange and said second flange are attached on either side of said respective concentric half circles.

* * * * *